(12) United States Patent
Hayek et al.

(10) Patent No.: US 10,949,317 B2
(45) Date of Patent: Mar. 16, 2021

(54) SENSOR SYSTEM FOR OUTPUTTING SENSOR DATA

(71) Applicant: Robert Bosch GmbH, Stuttgart (DE)

(72) Inventors: Jan Hayek, Munich (DE); Dorde Cvejanovic, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 367 days.

(21) Appl. No.: 16/128,890

(22) Filed: Sep. 12, 2018

(65) Prior Publication Data

US 2019/0095306 A1 Mar. 28, 2019

(30) Foreign Application Priority Data

Sep. 25, 2017 (DE) ..................... 10 2017 216 955.9

(51) Int. Cl.
*G06F 11/30* (2006.01)
*G06F 11/34* (2006.01)
*G05B 23/02* (2006.01)

(52) U.S. Cl.
CPC ...... *G06F 11/3089* (2013.01); *G06F 11/3034* (2013.01); *G06F 11/3476* (2013.01); *G05B 23/0221* (2013.01)

(58) Field of Classification Search
CPC ............ G06F 11/3089; G06F 11/3034; G06F 11/3476; G05B 23/0221; G01D 3/02; G01D 9/36; G01D 9/285; G01D 18/00; G01D 18/002
See application file for complete search history.

(56) References Cited

U.S. PATENT DOCUMENTS

| | | | |
|---|---|---|---|
| 2005/0197755 A1* | 9/2005 | Knowlton | G01S 19/50 701/50 |
| 2018/0173813 A1* | 6/2018 | Spiro | G06K 9/00 |
| 2018/0203481 A1* | 7/2018 | Chen | H04J 3/0661 |

FOREIGN PATENT DOCUMENTS

DE 102012207138 A1 10/2013

* cited by examiner

*Primary Examiner* — Manuel L Barbee
(74) *Attorney, Agent, or Firm* — Norton Rose Fulbright US LLP; Gerard Messina

(57) ABSTRACT

A sensor system for outputting sensor data, including at least one sensor element, a provision device for providing sensor data of the at least one sensor element, a control device for controlling the at least one sensor element, and an output device for outputting sensor data of the at least one sensor element; a data processing device being set up, with the aid of which the control device is configurable to provide a time interval between the time of providing the sensor data and the time of outputting sensor data via the output device, and the sensor data provided may be fetched out of the provision device and/or modified and/or written back to the provision device within the time interval provided.

18 Claims, 3 Drawing Sheets

SENSOR SYSTEM FOR OUTPUTTING SENSOR DATA

CROSS REFERENCE

The present application claims the benefit under 35 U.S.C. § 119 of German Patent Application No. DE 102017216955.9 filed on Sep. 25, 2017, which is expressly incorporated herein by reference in its entirety.

BACKGROUND INFORMATION

The present invention relates to a sensor system for outputting sensor data, including at least one sensor element, a provision device for providing sensor data of the at least one sensor element, a control device for controlling the at least one sensor element, and an output device for outputting sensor data of the at least one sensor element.

The present invention also relates to a method for influencing data of a sensor, to be outputted.

Although the present invention is generally applicable to sensor data, the present invention is described with regard to a fusion of sensor data.

The fusion of sensor data requires a plurality of sensors in a system, from which a new target variable is calculated. For example, from an initial position of a rigid body, the position at a later time may be calculated approximatively, using a series of values from an acceleration sensor and a yaw rate sensor. The sensor data fusion typically takes place in systems, which include a control unit and a plurality of sensors. The sensors typically supply new sensor data at a particular frequency and store them in a digital back end. This digital back end includes an FIFO memory, in which the data are temporarily stored. Before being written to the FIFO memory, the sensor data may be synchronized, using different methods. The sensor data are generated in the sensor, and after synchronization, they are optionally outputted either directly, via an interface, or indirectly, using a FIFO memory as temporary storage.

German Patent Application No. DE 10 2012 207 138 A1 describes a sensor for recording measured values and outputting data samples, the sensor including at least one first register for storing a sensor time, the register containing time data regarding the phase angle and/or period of the data samples, the first register being able to be read out externally. In this context, the sensor includes at least one second register, which is capable of being written to externally, and by which the bandwidth and resolution and/or the period of the data samples in the sensor are adjustable.

SUMMARY

In one specific embodiment, the present invention provides a sensor system for outputting sensor data, the sensor system including at least one sensor element, a provision device for providing sensor data of the at least one sensor element, a control device for controlling the at least one sensor element, and an output device for outputting sensor data of the at least one sensor element; a data processing device being set up, with the aid of which
the control device is configurable to provide a time interval between the time of providing the sensor data and the time of outputting sensor data via the output device; and
the sensor data provided may be fetched out of the provision device and/or changed and/or written back to the provision device within the provided time interval.

In one further specific embodiment, the present invention provides a method for influencing data of a sensor system, to be outputted, including the steps:
providing sensor data of at least one sensor element in a provision device;
fetching out and/or modifying and/or writing back the sensor data provided in the provision device, using a data processing device, within a predetermined time interval between the time of providing the sensor data and the time of outputting sensor data via an output device.

One of the advantages attained by this is that in this manner, the flexibility of the sensor system is increased considerably: With the aid of the data processing device, a time window needed for data manipulation is opened via the control device; the control device controlling the generation of data of the at least one sensor element in such a manner, that the desired time window/time interval is formed or is opened. This allows a multitude of possible data manipulations, for example, sensor data may be corrected and/or filtered, before the sensor data are outputted via an interface.

Further features, advantages and additional specific embodiments of the present invention are described in the following or become apparent through it:

According to one advantageous further refinement of the present invention, the data processing device includes a microcontroller, which is connected to the control device and to the provision device. A data processing device may be made available in a simple manner with the aid of a microcontroller.

According to another advantageous further refinement, the data processing device is configured to ascertain a time span for data modification or processing and to adapt the aforesaid time interval to this time span. This increases the effectiveness considerably, since the time interval then has a size, which is adapted substantially exactly to the time for the implementation of the data manipulation. In other words, this time window or time interval is then adjusted to the actually required run time of a data manipulation program. Consequently, the latency of the sensor data is minimized.

According to another advantageous further refinement, the data processing device is configured to write back only a portion of the fetched-out data to the provision device; the output device being configured to output only written-back and unaltered data. This allows for data compression in a simple manner, since data not written back are not passed on or processed further.

According to another advantageous further refinement, at least one storage device is set up on the basis of the FIFO principle, and the storage device is configured to store the data transmitted to the output device, prior to the outputting of the data by the output device. This allows temporary storage to be provided in a simple manner for the data to be outputted.

According to another advantageous further refinement, the control device includes a register, which is connected to the data processing device; the data processing device being configured to store a starting time and/or duration of the time interval via at least one entry in the register. This allows the control device to be configured in a simple and effective manner to provide the aforementioned time window/time interval, using the data processing device.

According to another advantageous further embodiment, the provision device includes a register and/or a shadow register. In this connection, it is advantageous, for example, that consistent data may be provided with the aid of the register and the shadow register.

According to another advantageous further refinement, using the data processing device, a control device for the at least one sensor element is configured to provide a time interval between the time of providing the sensor data and the time of outputting the sensor data. In this manner, first of all, a simple, corresponding configuration of the control device is made possible, and secondly, costly intervention in the configuration operation between the control device and the at least one sensor element is eliminated.

According to another advantageous further refinement, the predetermined time interval is adapted to the time span of fetching-out and/or modifying and/or writing back the data. Consequently, the latency of the sensor data is reduced.

According to another advantageous further refinement, fetched-out sensor data are only written back partially, and only written-back and/or unaltered sensor data are outputted. In this manner, for example, for a majority of sensor data, data compression may be rendered possible by only writing back their average value.

According to another advantageous further refinement, fetched-out sensor data are compared to data of at least one further data source, these are corrected in light of the result of the comparison, and the corrected data are written back to a temporary storage device. Therefore, for example, sensor data may be corrected, for example, an offset may be defined, or, for example, an increase in temperature of the surrounding area of the sensor may be compensated for, if a sensor for the ambient temperature is used as a data source.

Additional significant features and advantages of the present invention are shown in the figures and are described herein.

It is understood that the features mentioned above and explained below may be used not only in the combination respectively indicated, but also in other combinations, or by themselves, without departing from the scope of the present invention.

Preferred variants and specific embodiments of the present invention are represented in the figures and explained in further detail in the following description, where identical reference numerals refer to the same or similar or functionally identical component parts or elements.

DETAILED DESCRIPTION OF EXAMPLE EMBODIMENTS

Figure 1:
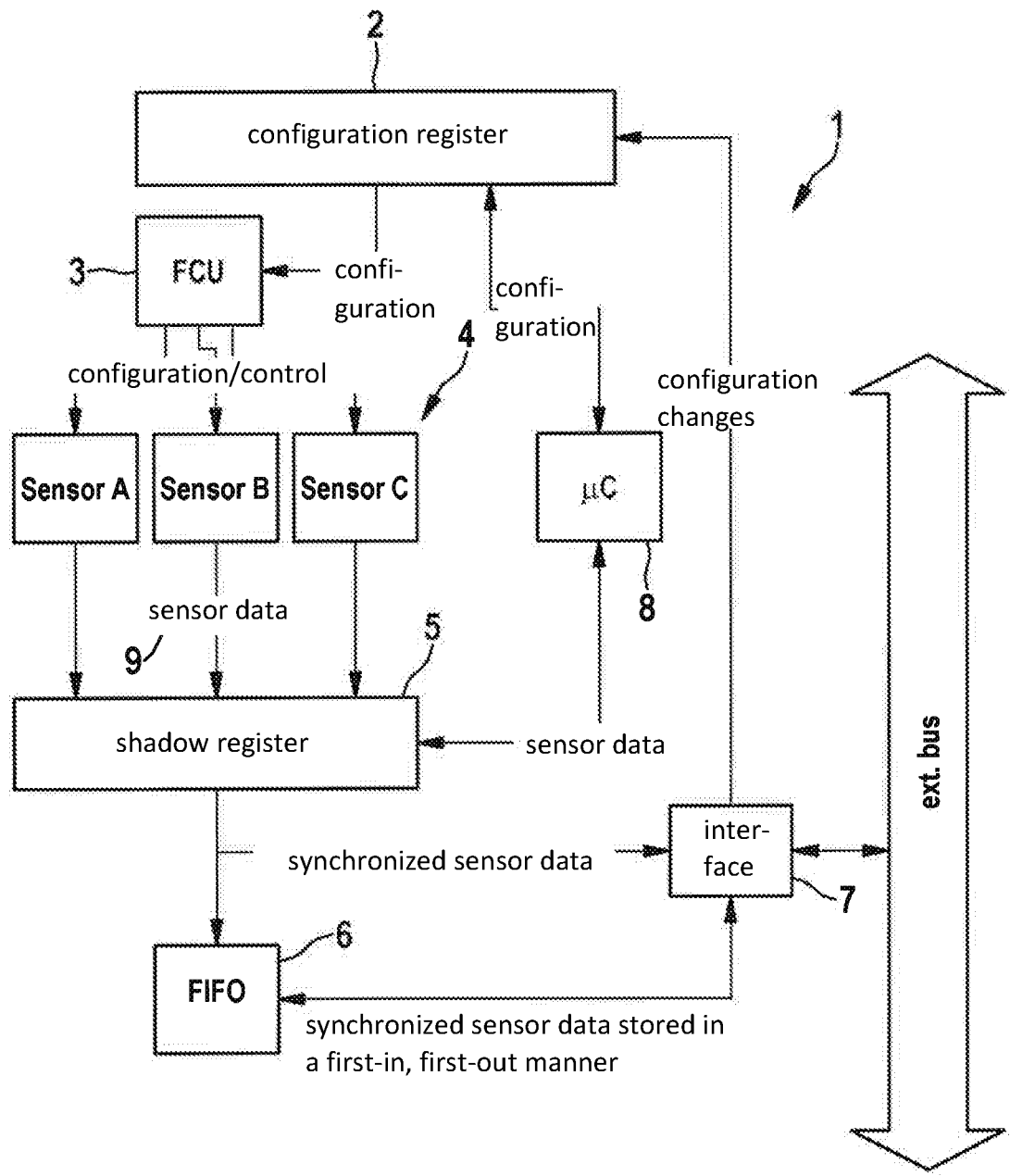
FIG. 1 shows a sensor system according to a specific embodiment of the present invention.

FIG. 1 shows a sensor system according to a specific embodiment of the present invention.

Specifically, a sensor system 1 is shown in FIG. 1. Sensor system 1 includes a control device 2, 3 having a configuration register 2 and a fusion control unit 3. In this context, configuration register 2 contains entries for a corresponding configuration of three sensors 4, which may be configured with the aid of fusion control unit 3. The sensor data provided by sensors 4, that is, the measurement data of sensors 4, are synchronized with the aid of a so-called shadow register 5, also called a data shadow, and may either be collected or extracted immediately subsequently via an interface 7, if these are requested by an external bus system for outputting the sensor data. Alternatively, these are initially stored temporarily in a first-in, first-out FIFO memory 6, which then allows the corresponding, stored, synchronized data to be collected or extracted subsequently via interface 7, on the basis of the FIFO principle, when these are requested by an external bus system for outputting the sensor data. Changes in configuration register 2 by the external bus system are also possible via interface 7.

A microcontroller 8 is set up to influence data; the microcontroller being connected to shadow register 5 and being able to fetch out and manipulate the data present in shadow register 5 and/or to write them back to shadow register 5. In other words, microcontroller 8 may therefore fetch out, manipulate and/or write back the data immediately after the generation of sensor data 9 by sensors 4 and prior to the storing of sensor data 9 in FIFO memory 6 and/or the transmission to interface 7.

Figure 2:
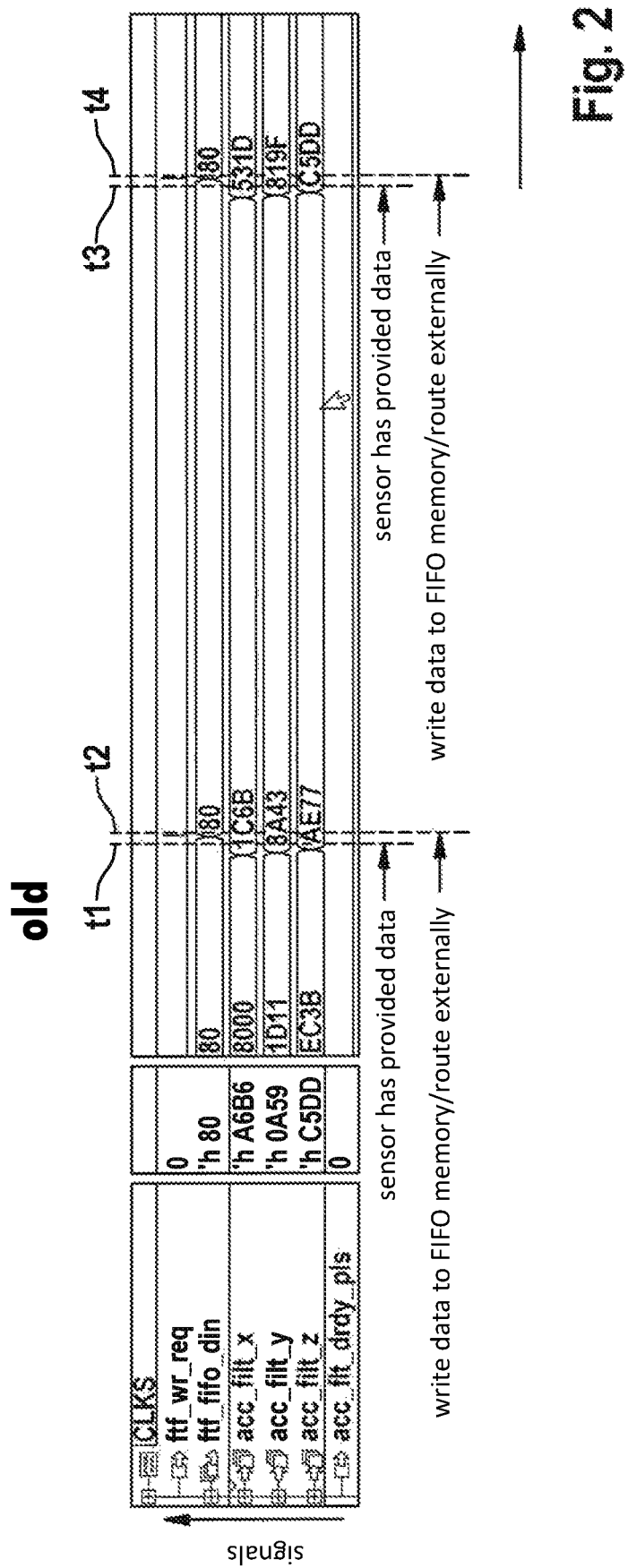
FIG. 2 shows temporal changes in parameters during the execution of a conventional method.

FIG. 2 shows temporal changes in parameters during the execution of a conventional method. Specifically, the temporal change in sensor data, as well as different signals of sensors 4, are shown in FIG. 2. In detail, the temporal change in the sensor signals (lower three lines), denoted by acc_filt_x, acc_filt_y, acc_filt_z, is shown on the right side of FIG. 2, whereas the uppermost line displays an indicator signal for the writing of data to FIFO memory 6. At time t1, the three sensors 4 have each provided sensor data 9. Subsequently, sensor data 9 are written to shadow register 5 and to FIFO memory 6 at time t2. The same operation is repeated for times t3 and, correspondingly, t4, etc. Time difference t2–t1 or t4–t3, that is, the time between the generation of sensor data 9 in the specific sensor and the writing of sensor data 9 to FIFO memory 6, is extremely short.

Figure 3:
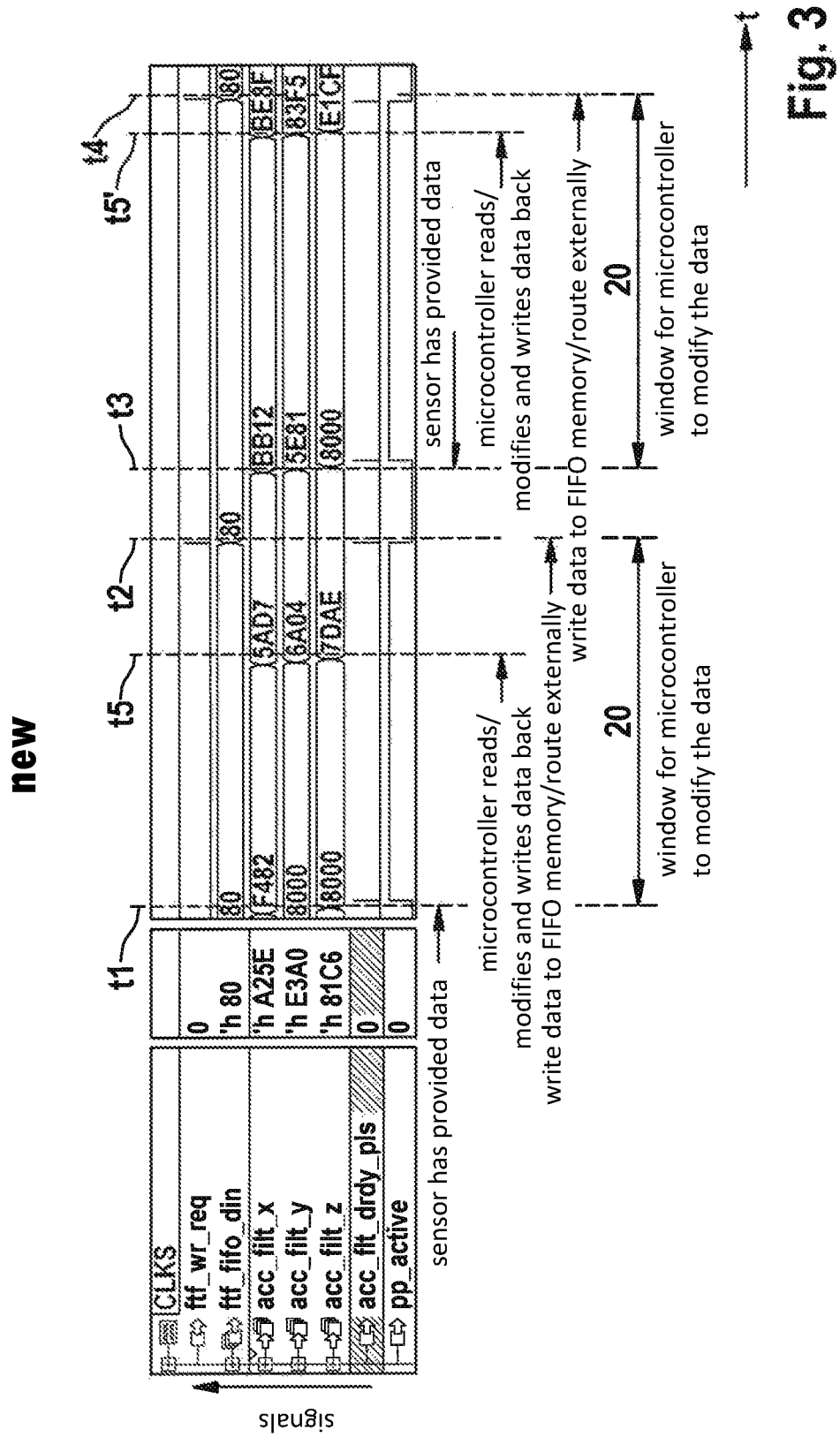
FIG. 3 shows temporal changes in parameters during the execution of a method according to a specific embodiment of the present invention.

FIG. 3 shows temporal changes in parameters during the execution of a method according to a specific embodiment of the present invention.

The change in sensor data 9 and in different indicator signals over time is shown in detail in FIG. 3. The temporal behavior of an indicator signal for the writing to FIFO memory 6 is shown on the right side of FIG. 3, in the second line from the top. Following below that, is the temporal behavior of sensor signals of three sensors 4, designated by acc_filt_x, acc_filt_y, acc_filt_z, and below that, in turn, an indicator signal for the opening and closing of a time interval for modifying and fetching out sensor data 9, and in the last line, a signal for the specific state of the data window, that is, if it is open or closed.

At time t1, sensors 4 have provided measurement data or sensor data 9 in shadow register 5. At the same time, a time window 20 for data manipulation is opened. As of time t1, microcontroller 8 fetches out the sensor data, modifies them and writes these sensor data 9 back. The writing-back of sensor data 9 is ended at time t5. At time t2, written-back sensor data 9 are transmitted to shadow register 5 and FIFO memory 6, stored there, and may be collected via interface 7. The corresponding writing to FIFO memory 6 is correspondingly indicated in the second line by a change in level of the signal. The same steps are subsequently repeated: at time t3, sensors 4 have provided measurement data 9. At the same time, a time interval 20 for modification of sensor data 9 by microcontroller 8 is opened. At time t5', microcontroller 8 has fetched out and modified sensor data 9, and also written these sensor data 9 back again. At time t4, time interval 20 for data modification is closed again, sensor data 9 are written to FIFO memory 6 or to shadow register 5.

The microcontroller may adapt time interval 20 flexibly to the run time of the data manipulation program actually needed, or in general, to the time needed for the data manipulation, in order to minimize the latency of sensor data 9. In FIG. 3, this means that times t5 and t2 lie as close to each other as possible. The same applies to times t5', t4. During the time interval 20 for data manipulation, microcontroller 8 may fetch out and/or manipulate and/or write back sensor data 9. If the data are not written back, then they are also not written to FIFO memory 6 or to shadow register 5.

Via data manipulation, for example, sensor data may be corrected, for example, an offset may be inserted, or corresponding compensation/calibration of the sensor data, or the like. Certain software filters may be applied to the fetched-out data, as well. In addition, more complex data manipulation is also possible, for example, the implementation of a so-called incremental counter, where the fetched-out sensor data are replaced by other more abstract data in accordance with a corresponding evaluation: if the sensor supplies a number of particular upward and downward movements on the basis of acceleration sensors, microcontroller 8 may evaluate these and associate them with a particular number of steps of a person. This number of steps may then be written back in place of the acceleration values. Furthermore, data compression is also possible, for example, by averaging sensor data, and, in place of, e.g., ten sensor data, merely writing back only the mean of these sensor data.

With reference to FIGS. 1 and 3, the method includes the following steps:
1. Microcontroller 8 informs fusion control unit 3, that it should open a time interval 20 for data manipulation, as well as how large this time interval 20 is.
2. Accordingly, fusion control unit 3 opens time window 20.
3. Fusion control unit 3 informs microcontroller 8, that the corresponding window or time interval 20 for data manipulation has been opened.
4. Microcontroller 8 fetches out the data from shadow register 5.
5. Microcontroller 8 manipulates the data.

Optionally, in a further step, microcontroller 8 may then write back the data completely or partially.

In summary, at least one specific embodiment of the present invention renders possible at least one of the following advantages:
simple data manipulation
higher flexibility
more cost-effective provision of data
implementation of more complex functions.

Although the present invention was described in light of preferred exemplary embodiments, it is not limited to them, but is modifiable in numerous ways.

What is claimed is:

1. A sensor system for outputting sensor data, comprising:
at least one sensor element;
a provision device for providing sensor data of the at least one sensor element;
a control device for controlling the at least one sensor element; and
an output device for outputting the sensor data of the at least one sensor element;
a data processing device being set up, with the aid of which (i) the control device is configurable to provide a time interval between the time of providing the sensor data and the time of outputting sensor data via the output device, and (ii) the sensor data provided may be fetched out of the provision device and/or modified and/or written back to the provision device within the time interval provided, wherein the predetermined time interval is adapted based on a time span of the fetching out and/or modifying and/or writing back the sensor data.

2. The sensor system as recited in claim 1, wherein the data processing device includes a microcontroller, which is connected to the control device and to the provision device.

3. The sensor system as recited in claim 1, wherein the data processing device is configured to ascertain the time span for data modification and to adapt the time interval to the time span.

4. The sensor system as recited in claim 1, wherein the data processing device is configured to write back only a portion of the fetched-out sensor data to the provision device, and the output device is configured to output only written-back and unaltered data.

5. The sensor system as recited in claim 1, wherein the provision device includes a register and/or a shadow register.

6. The sensor system as recited in claim 1, wherein the data processing device is configured to write back only a portion of the fetched-out sensor data to the provision device.

7. A sensor system for outputting sensor data, comprising:
at least one sensor element;
a provision device for providing sensor data of the at least one sensor element;
a control device for controlling the at least one sensor element; and
an output device for outputting the sensor data of the at least one sensor element;
a data processing device being set up, with the aid of which (i) the control device is configurable to provide a time interval between the time of providing the sensor data and the time of outputting sensor data via the output device, and (ii) the sensor data provided may be fetched out of the provision device and/or modified and/or written back to the provision device within the time interval provided, wherein at least one storage device is set up on the basis of the FIFO principle, and the storage device is configured to store the data transmitted to the output device, prior to the outputting of the data by the output device.

8. The sensor system as recited in claim 7, wherein the data processing device is configured to ascertain a time span for data modification and to adapt the time interval to the time span.

9. The sensor system as recited in claim 7, wherein the data processing device is configured to write back only a portion of the fetched-out sensor data to the provision device, and the output device is configured to output only written-back and unaltered data.

10. The sensor system as recited in claim 7, wherein the provision device includes a register and/or a shadow register.

11. A sensor system for outputting sensor data, comprising:
at least one sensor element;
a provision device for providing sensor data of the at least one sensor element;
a control device for controlling the at least one sensor element; and
an output device for outputting the sensor data of the at least one sensor element;

a data processing device being set up, with the aid of which (i) the control device is configurable to provide a time interval between the time of providing the sensor data and the time of outputting sensor data via the output device, and (ii) the sensor data provided may be fetched out of the provision device and/or modified and/or written back to the provision device within the time interval provided, wherein the control device includes a register, which is connected to the data processing device, and the data processing device is configured to store a starting time and/or duration of the time interval via at least one entry in the register.

12. The sensor system as recited in claim 11, wherein the data processing device is configured to ascertain a time span for data modification and to adapt the time interval to the time span.

13. The sensor system as recited in claim 11, wherein the data processing device is configured to write back only a portion of the fetched-out sensor data to the provision device, and the output device is configured to output only written-back and unaltered data.

14. The sensor system as recited in claim 11, wherein the provision device includes a register and/or a shadow register.

15. A method for influencing data of a sensor system, to be output, comprising:

providing sensor data of at least one sensor element in a provision device;

fetching out and/or modifying and/or writing back the sensor data provided in the provision device, using a data processing device, within a predetermined time interval between a time of providing the sensor data and a time of outputting the sensor data via an output device, wherein the predetermined time interval is adapted based on a time span of the fetching out and/or modifying and/or writing back the sensor data.

16. The method as recited in claim 15, wherein with the aid of the data processing device, a control device for the at least one sensor element is configured to provide a time interval between the time of providing the sensor data and the time of outputting the sensor data.

17. The method as recited in claim 15, wherein fetched-out sensor data are written back only partially, and only written-back and/or unaltered sensor data are outputted.

18. The method as recited in claim 15, wherein fetched-out sensor data are compared to data of at least one other data source, corrected in light of the result of the comparison, and the corrected data are written back to a temporary storage device.

\* \* \* \* \*